(12) United States Patent
Poremba et al.

(10) Patent No.: US 8,593,838 B2
(45) Date of Patent: Nov. 26, 2013

(54) POWER SUPPLY DEVICE

(75) Inventors: Andreas Poremba, Wuppertal (DE); Jürgen Lehmkuhl, Dinslaken (DE)

(73) Assignee: KROHNE Messtechnik GmbH, Duisburg (DE)

( * ) Notice: Subject to any disclaimer, the term of this patent is extended or adjusted under 35 U.S.C. 154(b) by 432 days.

(21) Appl. No.: 12/955,045

(22) Filed: Nov. 29, 2010

(65) Prior Publication Data
US 2012/0038345 A1 Feb. 16, 2012

(30) Foreign Application Priority Data

Aug. 10, 2010 (DE) .......................... 10 2010 033 954

(51) Int. Cl.
*H02H 7/10* (2006.01)
*H02H 9/08* (2006.01)

(52) U.S. Cl.
USPC .......................................... 363/50; 361/93.9

(58) Field of Classification Search
USPC .......... 363/50, 52, 53; 361/18, 52, 56, 57, 79, 361/86, 87, 93.7, 93.9, 101
See application file for complete search history.

(56) References Cited

U.S. PATENT DOCUMENTS

| | | | |
|---|---|---|---|
| 4,831,484 A | 5/1989 | Bruch | |
| 5,050,060 A * | 9/1991 | Geuns | 363/126 |
| 5,694,283 A | 12/1997 | Huczko | |
| 6,100,607 A * | 8/2000 | Olivieri et al. | 307/125 |
| 6,639,816 B2 * | 10/2003 | Liu | 363/65 |
| 7,075,765 B2 | 7/2006 | Frey et al. | |
| 7,091,631 B2 | 8/2006 | Junker | |
| 7,453,710 B2 * | 11/2008 | Baurle et al. | 363/52 |
| 7,792,646 B2 | 9/2010 | Karbula et al. | |
| 8,355,236 B2 * | 1/2013 | Yuba et al. | 361/160 |
| 2009/0206790 A1 * | 8/2009 | Spartano et al. | 320/107 |

FOREIGN PATENT DOCUMENTS

DE 41 15 295 A1 11/1992

OTHER PUBLICATIONS

Firma Pepperl+Fuchs GMBH: "Dart Dynamic ARC Recognition and Termination", Part-No. 209088, Apr. 2008, Mannheim, Germany, (No English Translation Available).

* cited by examiner

*Primary Examiner* — Matthew Nguyen
(74) *Attorney, Agent, or Firm* — Roberts Mlotkowski Safran & Cole, P.C.; David S. Safran

(57) ABSTRACT

A power supply device for intrinsically safe power supply of an intrinsically safe load circuit includes a voltage source, a power-limiting circuit including at least two controllable semiconductor devices, a current-limiting circuit including at least one resistor, and a load circuit connector connected to the load circuit. The power-limiting circuit and the current-limiting circuit are active between the voltage source and the load circuit connector. The resistor includes a resistance value that suffices to limit a short circuit current to a current without danger of a spark ignition.

8 Claims, 1 Drawing Sheet

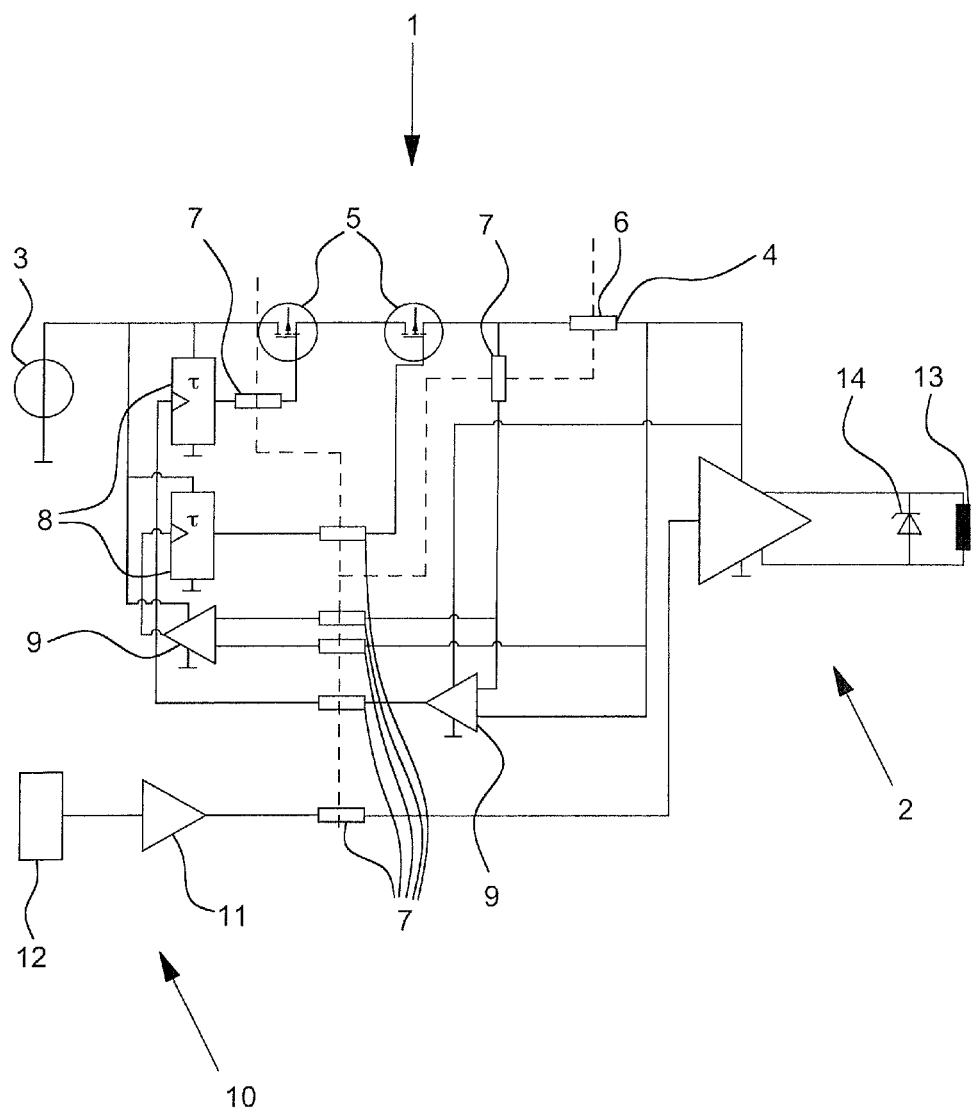

POWER SUPPLY DEVICE

FIELD OF THE INVENTION

The invention relates to a power supply device, and more particularly, to a power supply device for intrinsically safe power supply to an intrinsically safe load circuit.

BACKGROUND OF THE INVENTION

Regulations for the construction and examination of intrinsically safe equipment intended for use in areas in danger of gas explosion and of associated equipment for connection to intrinsically safe circuits that lead into such areas are stipulated in standard International Electrotechnical Commission (IEC) 60079-11. This standard is also valid for electric equipment or parts of electric equipment, which are found outside of the areas in danger of gas explosion or which are protected by another sort of ignition protection according to IEC 60079-0. The intrinsic safety of the electric circuits in the areas in danger of gas explosion depends on the design and construction of the electric equipment or parts of electric equipment that are found outside of the areas in danger of gas explosion. "Intrinsic safety" as a type of ignition protection is based on the limitation of electric energy within the equipment and on connecting cables, exposed to an explosive atmosphere, to a level below which ignition by spark formation or heating can no longer take place.

The term "malfunction" is of particular importance within the relevant standards. Every defect of any component, disconnection, insulation or connection between components is meant here, which is not stipulated as non-susceptible to malfunctions by IEC 60079-11 and on which the intrinsic safety of a circuit depends. Malfunctions are differentiated into countable malfunctions and non-countable malfunctions. Countable malfunctions are malfunctions that occur in parts of the electric equipment, which satisfy the construction requirements of IEC 60079-11. Other malfunctions are characterized as non-countable malfunctions.

For example, the requirement for electric equipment with the protection level "ia" resulting from the standard is that the intrinsically safe circuits of the equipment at a defined set voltage should not be able to cause ignition in undisturbed operation. In addition, these intrinsically safe circuits should not be able to cause ignition with the presence of two countable malfunctions together with those non-countable malfunctions, which result in the most unfavorable condition.

In order to avoid thermal ignition, all surfaces of components, housing and the wiring that could come into contact with explosive gas atmospheres have to be evaluated and/or tested in terms of maximum temperature. This results in upper limits for allowable power dissipation of components as a function of surface size and the maximum ambient temperature. Accordingly, it is necessary to limit the power that is maximally provided to these components.

The choice of allowable components for the limitation of current is, however, limited. Controllable semiconductor devices may only be used as current-limiting circuits connected in series in electric equipment with protection levels "ib" and "ic". However, current limiters connected in series comprising controllable and non-controllable semiconductor devices may be used for limiting power for equipment with the protection level "ia".

An electric safety barrier for protecting consumers and/or transmitters found in areas in danger of explosion is known from German Patent DE 36 22 268 C1 and corresponding U.S. Pat. No. 4,831,484, which is connected via cables to circuit parts found outside of the areas in danger of explosion. Two longitudinal control members connected in series are used in this safety barrier, which are controlled by four control circuits. The control voltage for the control circuits here is the sum of at least a part of the output voltage of a current-measuring member and at least one part of a voltage corresponding to the voltage drop in the longitudinal control members.

In particular, the current-measuring member is an ohmic resistor and the longitudinal control member and the control circuit are formed by transistors. The ohmic resistor is chosen here so that, at a desired limiting current, such a voltage drop is created across this resistor. The control voltage reaches a sufficiently large value—for example 0.6 volts—in order to conductively switch a transistor of the control circuit, through which, in turn, the transistor of an associated longitudinal control member is switched in a non-conductive state. The ohmic resistor not only limits a short-circuit current in a connected consumer but also sets a desired limiting current, which leads to a corresponding control of the semiconductor devices. The electric safety barrier is also not sufficient for protection level "ia" since, when there is a short-circuit of either longitudinal control members or the first longitudinal control member and the transistor of an associated control circuit, a sufficient limitation of a short-circuit current in a connected consumer is not guaranteed.

It is known from the prior art to use safety fuses for limitation of current or power. In the case of a malfunction that results in triggering and blowing a safety fuse, however, the safety fuse has to be replaced, which can lead to a bit of effort in the case of power supply devices that are not easily accessible. It is also known from the prior art to use resistors for limiting power. In order to limit the power to a value of 1 watt required to avoid thermal ignition, a resistance of at least 144 ohm is necessary at the given voltage of 12 volts. In the case of a power-adapted consumer, i.e., that the resistance of the load current is chosen to be the same as the resistance for limiting power, one quarter of this value, namely 36 ohm, is potentially sufficient. The use of a resistor for limiting power, however, has the disadvantage that undesirably high power dissipation falls take place in this resistor.

SUMMARY OF THE INVENTION

A primary object of the present invention is to provide a power supply device that has a small as possible power dissipation. This object is met based on a power supply device including a current-limiting circuit formed by at least one resistor. The resistor has a resistance value that just suffices to limit short circuit current to a current at which there is no danger of a spark ignition.

It can be seen from table A.1 of IEC 60079-11 that in order to limit only the short-circuit current to the allowable highest value for the equipment group TIC at a given voltage of 12 volts, a resistance of about 3.6 ohm is sufficient. Thus, a distinctly lower power dissipation takes place in the resistor when using a resistor for power limitation. A further advantage consists in that no safety fuses are used in the power supply device according to the invention, which principally have to be exchanged after being triggered once. In the power supply device according to the invention, the resistor is formed as a non-susceptible resistor according to IEC 60079-11, as is required for the protection levels "ia" and "ib". The design of the resistor using multiple resistors, i.e., a network of resistors, remains in the scope of the invention, as long as the intrinsic safety is still guaranteed by it.

In general, it is provided by the invention to design the power supply device in such a manner that it fulfills the requirements of IEC 60079-11. In particular, the power supply device, in the case that it is prepared for protection level "ia" or "ib", is designed such that in undisturbed operation and in operation according to the set malfunction conditions for the corresponding protection level, on which the ignition protection depends, the remaining components are operated with no more than two thirds of their maximum current, their maximum voltage and their maximum power. Here, the maximum current, the maximum voltage and the maximum power are related to the rated value of the components, the mounting conditions and the set temperature range. This operation does not apply to components such as transformers, fuses, thermal triggers, relays, optocouplers and switches.

A voltage source of the power supply device according to the invention is also designed according to the requirements for intrinsic safety. In particular, the input voltage supplied by the voltage source is limited, e.g., by Zener diodes to a maximum voltage. The power supply device according to the invention is particularly suitable for intrinsically safe power supply to mass flowmeters, such as Coriolis mass flowmeters or electromagnetic mass flowmeters.

According to an advantageous development of the invention, it is provided that a power-limiting circuit and the current-limiting circuit are connected in series after one another, in particular, the current-limiting circuit is connected to a load circuit connector. This ensures that the load circuit connector is secured by the current-limiting circuit as well as by the power-limiting circuit in any case. Alternatively, the serial connection can also occur in such a manner that the power-limiting circuit is connected to the load circuit connector.

According to a further advantageous development of the invention, it is provided that a load current taken from the load circuit connector is measured with a current-measuring means, and at least one of controllable semiconductor devices is controlled by a power control system using the measured load current. Using this power control system, it is guaranteed in a simple and efficient manner that, in the case of high power consumption of the load circuit endangering the intrinsic safety, the controllable semiconductor devices are controlled so that power consumption does not exceed the upper limit to be complied with. It is particularly advantageous to control the controllable semiconductor devices in the case of high power consumption of the load circuit endangering the intrinsic safety so that the flow of current through the controllable semiconductor devices is completely discontinued. The controllable semiconductor devices are then operated, in this case, by the power control system in switch mode.

In an embodiment of the invention, it is provided that at least one of the two controllable semiconductor devices is controlled by at least one power control system formed as a control timer. The control timer is an electronic component that delivers a defined output signal after its activation by a corresponding activation signal for a pre-determined amount of time. According to the invention, the control timer is used in order to control at least one of the two controllable semiconductor devices. In particular, each control timer is assigned to a comparator, through which, in turn, the control timer can be controlled.

A very advantageous further development of the invention provides two control timers, of which each controls one of the two controllable semiconductor devices. Each of the two control timers control one of the two controllable semiconductor devices such that, in the case of high power consumption of the load circuit endangering the intrinsic safety, both controllable semiconductor devices completely discontinue the flow of current for a pre-determined amount of time. After the course of the pre-determined amount of time, both controllable semiconductor devices switch back to the conductive state as long as no high power consumption of the load circuit endangering the intrinsic safety is present. After this, normal operation can be resumed.

According to a further advantageous development of the invention, it is provided that the current-measuring means for measuring the current load is formed at least partially using the resistor. The measurement of the current load with the resistor represents a simple and economical possibility to monitor the current load, since, in this manner, no additional resistor has to be provided for measuring the current load.

An embodiment of the invention provides that the voltage drop across the resistor acts as an input signal for at least one operation amplifier switched as a difference amplifier, and the output signal of the operation amplifier acts as a measure for the load current. The output signal acting as a measure for the current load is preferably fed to the power control system via an adequate circuitry.

It has been shown to be of particular advantage when the power consumption of the intrinsically safe current load is directly controlled by a further power control system. This additional and directly-acting further power control system consequently intervenes in the load circuit itself, seen from the point of view of the power supply device, i.e., load-side beyond the load circuit connectors. Using this further power control system, limitation of power consumption already occurs in the load circuit, so that during nominal operation, the power-limiting circuit does not trigger the power supply device according to the invention. This is due to the power consumption of the intrinsically safe load circuit being already limited to intrinsically safe values by the further power control system acting directly on the load circuit.

According to a further embodiment of the invention, it is provided that the further power control system has a digital/analog converter. This is advantageous especially in conjunction with a further particular embodiment of the invention, in which a digital input signal from a microprocessor is provided to the digital/analog converter and the analog output signal of the digital/analog converter is made available to the intrinsically safe load circuit for controlling the power consumption of the load circuit. The use of the digital/analog converter in conjunction with the microprocessor makes the automated control of the power consumption of the intrinsically safe load circuit possible from outside of the area in danger of explosion. Since the further power control system is conductively connected with the load circuit, it is advantageous that the further power control system also complies with the requirements for IEC 60079-11.

According to a further development of the invention, it is provided that the voltage source is based on power-i-technology.

In detail, there are a plurality of possibilities for designing and further developing the power supply device according to the invention. Here, please refer to the patent claims subordinate to patent claim 1 as well as the following detailed description of a preferred embodiment of the invention in respect to the drawing.

BRIEF DESCRIPTION OF THE DRAWINGS

The sole FIGURE is a schematic view of a power supply device according to the invention in conjunction with a load circuit controlled by one of a further power control system.

DETAILED DESCRIPTION OF THE INVENTION

An intrinsically safe load circuit 2 is connected to a power supply device 1 in FIG. 1. The power supply device 1 includes a voltage source 3, which provides an intrinsically safe, limited input voltage. The power supply device 1 further includes a power-limiting circuit, a current-limiting circuit and a load circuit connector 4 onto which the load circuit 2 is connected. The power-limiting circuit includes two controllable semiconductor devices 5. The current-limiting circuit includes a resistor 6. Both controllable semiconductor devices 5 are connected in series and arranged between the voltage source 3 and the resistor 6. The resistor 6 forms the load circuit connector 4 with its connection that is not connected to the controllable semiconductor device 5.

It is now essential for the shown power supply device 1 that the resistor 6, which forms the current-limiting circuit, has a resistance that just suffices to limit a short circuit current to a current at which there is no danger of a spark ignition. By this dimensioning of the resistance, an essentially lower power dissipation results than with the use of the resistor 6 for both current and also power limitation.

A particular characteristic of the power supply device 1 is that the required power limitation occurs by means of the controllable semiconductor device 5. A control timer 8 is connected to the control connections of both controllable semiconductor devices 5 via a safety resistor 7. An input signal for the control timer 8 is made available by an operational amplifier 9 switched as a difference amplifier. For both operational amplifiers 9, a voltage drop across the resistor 6 serves as an input signal, and both operational amplifiers 9 deliver output signals, which act as a measure for the load current. By means of this circuitry, the power limitation of the load current taken from the load current connector 4 occurs using the measured load current.

The entire power supply device 1 is separated into intrinsically safe segregated areas by further safety resistors 7. In particular, the load circuit 2 arranged in the area in danger of explosion is connected intrinsically safe with the equipment located outside of the area in danger of explosion. The borders between the areas separated in this manner are shown in FIG. 1 with dashed lines.

The power consumption of the intrinsically safe load circuit 2 is controlled by a further power control system 10. This further power control system 10 limits the power consumption of the intrinsically safe load circuit 2 to a value that eliminates ignition on hot surfaces in the area in danger of explosion. The further power control system 10 includes a digital/analog converter 11, which is provided with a digital input signal from a microprocessor 12. The microprocessor 12 implements, in terms of hardware, a method not mentioned here in detail for controlling or regulating the power consumption of the load circuit 2. The method is implemented on the microprocessor 12 as software, and the microprocessor 12 delivers a digital standard value for the target power consumption of the load circuit 2. The analog output signal corresponding to the digital standard value of the digital/analog converter 11 is made available to the intrinsically safe load circuit 2 via a safety resistor 7 for controlling the power consumption.

The load circuit 2 includes a sensor coil 13 in the example shown here. The load circuit can have arbitrary other loads, which depends on the concrete use. The normally very high inductance of the sensor coil 13 is made ineffective by a Zener diode 14 switched parallel to the coil 13, i.e., a voltage induced in the sensor coil 13 by a quick change in current is limited by the Zener diode 14 to an intrinsically safe value.

What is claimed is:

1. Power supply device for intrinsically safe power supply of an intrinsically safe load circuit, comprising:
    a voltage source;
    a power-limiting circuit comprising at least two controllable semiconductor devices;
    a current-limiting circuit comprising at least one resistor;
    a load circuit connector connected to the load circuit; and
    a current-measuring means is provided for measuring a load current taken from the load circuit connector,
    wherein the power-limiting circuit and the current-limiting circuit are active between the voltage source and the load circuit connector,
    wherein the resistor has a resistance value that suffices to limit a short circuit current to a current without danger of a spark ignition, and
    wherein the current-measuring means also comprises at least one operation amplifier which is switched as a difference amplifier, the at least one operation amplifier having an input connected to said resistor such that a voltage drop across the resistor acts as an input signal therefor, and an output adapted to produce an output signal acting as a measure of the load current.

2. The power supply device according to claim 1, wherein:
    the power-limiting circuit and the current-limiting circuit are connected in series after one another; and
    the current-limiting circuit is connected to the load circuit connector.

3. The power supply device according to claim 1, wherein:
    a power control system is provided for controlling at least one of the controllable semiconductor devices based upon the measured load current.

4. The power supply device according to claim 3, wherein the power control system comprises a control timer.

5. The power supply device according to claim 1, further comprising an additional power control system for controlling power consumption of the intrinsically safe load circuit.

6. The power supply device according to claim 5, wherein the additional power control system comprises a digital/analog converter.

7. The power supply device according to claim 6, wherein:
    a microprocessor is provided that is adapted to provide a digital input signal to the digital/analog converter; and
    the digital/analog converter has an output connected to the intrinsically safe load circuit for providing an analog output signal thereto for controlling the power consumption of the intrinsically safe load circuit by the additional power control system.

8. The power supply device according to claim 1, wherein the voltage source is based on power-i-technology.

* * * * *